(12) United States Patent
Kawasaki et al.

(10) Patent No.: US 8,256,407 B2
(45) Date of Patent: Sep. 4, 2012

(54) MULTI-WIRE SAW AND METHOD FOR CUTTING INGOT

(75) Inventors: Takafumi Kawasaki, Chiyoda-ku (JP);
Seiichi Mimura, Chiyoda-ku (JP);
Hirokazu Nishida, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 463 days.

(21) Appl. No.: 12/666,721

(22) PCT Filed: Jun. 27, 2007

(86) PCT No.: PCT/JP2007/062931
§ 371 (c)(1),
(2), (4) Date: Dec. 24, 2009

(87) PCT Pub. No.: WO2009/001453
PCT Pub. Date: Dec. 31, 2008

(65) Prior Publication Data
US 2010/0163009 A1 Jul. 1, 2010

(51) Int. Cl.
*B28D 1/06* (2006.01)
(52) U.S. Cl. .................................. 125/16.01; 451/311
(58) Field of Classification Search ............. 125/16.01, 125/21; 451/296, 311, 5
See application file for complete search history.

(56) References Cited

U.S. PATENT DOCUMENTS

| | | | | |
|---|---|---|---|---|
| 5,715,807 A | * | 2/1998 | Toyama et al. | 125/16.02 |
| 5,913,305 A | * | 6/1999 | Hauser | 125/16.02 |

FOREIGN PATENT DOCUMENTS

| | | |
|---|---|---|
| JP | 7-276218 A | 10/1995 |
| JP | 8-11047 A | 1/1996 |
| JP | 3083232 B2 | 9/2000 |
| JP | 2001-79748 A | 3/2001 |
| JP | 2004-243509 A | 9/2004 |
| WO | WO 2005/037968 | 4/2005 |
| WO | WO 2005/039824 | 5/2005 |

OTHER PUBLICATIONS

International Search Report for PCT/JP2007/062931 completed Jul. 18, 2007.
Written Opinion for PCT/JP2007/062931 completed Jul. 18, 2007.

* cited by examiner

*Primary Examiner* — Robert Rose
(74) *Attorney, Agent, or Firm* — Buchanan Ingersoll & Rooney PC

(57) ABSTRACT

To provide a multi-wire saw that, at the start of cutting of an ingot, prevents a wire from being displaced in grooves of guide rollers due to the wire being lifted. A wire is wound around a plurality of wire guide rollers to be positioned in a feeding direction of an ingot, and in this state, a wire-lifting restraining member that is a body of rotation and restrains the wire from being lifted by being brought into contact with the wire is disposed near the wire guide rollers.

6 Claims, 5 Drawing Sheets

MULTI-WIRE SAW AND METHOD FOR CUTTING INGOT

TECHNICAL FIELD

The present invention relates to a multi-wire saw for cutting an ingot for manufacturing wafers, and a method for cutting an ingot.

BACKGROUND ART

A multi-wire saw with which a large number of wafers can be cut out at once with a relatively small cutting allowance has been used for cutting a silicon ingot. The multi-wire saw is configured such that a wire fed from a wire-feeding mechanism is wound around between two wire guide rollers at a pitch of about 0.3 to 0.4 millimeter, and the wire is wound up by a wire winding-up mechanism. A tension roller that constantly applies a predetermined tension to the wire is provided in between the wire-feeding mechanism and the wire guide rollers, and in between the wire guide rollers and the wire winding-up mechanism. In the thus configured multi-wire saw, the wire-feeding mechanism, the two wire guide rollers and the wire winding-up mechanism are synchronously controlled to be driven and the position of the tension roller is controlled so that the wire is fed at a speed of about 600 m/min, and slurry is applied to the wire. In this state, an ingot that is fixedly adhered to a working plate is fed downward. Then, abrasives are pressed against the ingot with the wire and the ingot is rolled so that micro-cracks are produced on a surface layer of the ingot and scraped to be removed as silicon fine particle dust. Thus, the silicon ingot is cut. When cutting the silicon ingot, the cutting allowance is required to be reduced and wafers is required to be thinner in order to achieve a higher yield of wafers and cost reduction of a material for wafers.

In order to reduce the cutting allowance, a wire diameter can be made smaller. However, because the breaking strength of the wire is proportionally decreased in this case, tension applied to the wire needs to be reduced. The reduced tension weakens force that allows the wire to be wound around the wire guide rollers, and the wire is displaced in guide grooves that are formed on the wire guide rollers for receiving the wire. Thus, it results in varying in thicknesses of wafers cut out from the ingot.

In manufacturing a solar cell, a positioning member is pressed against an edge of a wafer to position the wafer and to perform a predetermined process, and then the wafer is transferred to the subsequent process step. A positioning member is pressed against the edge of the wafer again to position the wafer. Such processes are repeatedly performed for a large number of times. Therefore, a wafer having a thin edge cannot withstand such pressing force that is repeatedly applied thereto, resulting in producing cracks or chips on the edge of the wafer and the wafer becomes defective.

In order to cut out sinner wafers, a pitch of the wound wire needs to be narrowed. However, the narrower pitch makes the guide grooves formed on the wire guide rollers shallow, so that increasing the probability of disengagement of the wire from the guide grooves increases. The disengagement of the wire from the guide grooves causes wafers near the wire not to be cut out. In the worst scenario, the wire might be tangled and broken and thus non-defective wafers cannot be obtained at all.

These problems, such as the displacement in the guide grooves and the disengagement of the wire from the guide grooves on the wire guide rollers, predominantly arise after completion of cutting the silicon ingot. For example, when the ingot is disengaged from the wire (the wire is withdrawn from the ingot) after the completion of cutting the silicon ingot, the wire is caught and drawn by the ingot to be disengaged by being lifted from the guide grooves on the wire guide rollers. In order to prevent the wire from being displaced in and disengaged from the guide grooves, a restraining unit that holds the wire near the ingot access area to the wire after the completion of cutting of the silicon ingot is proposed (see Patent Document 1). This restraining unit is configured as a pair, and moves according to variation of the outer diameter or movement of the ingot so as to be arranged near the access area to the wire at any time when the wire is withdrawn. Further, the unit serves as a slurry supplying unit.

[Patent Document 1] Japanese Patent No. 3083232

DISCLOSURE OF INVENTION

Problem to be Solved by the Invention

As indicated in Patent Document 1 described above, prevention of the disengagement of the wire from the guide grooves on the wire guide rollers when the wire is disengaged from the ingot after the completion of cutting the silicon ingot has already been proposed. However, also at the start of cutting the silicon ingot upon manufacturing wafers used for solar cells, a thickness variation at cutting start parts (edges of the wafers) and the disengagement of the wire from the guide grooves on the wire guide rollers may occur. Therefore, measures need to be taken against the thickness variation at cutting start parts at the start of cutting the silicon ingot, and for the prevention of the disengagement of the wire from the guide grooves; however, no measures have heretofore been proposed.

The present invention is made in light of the foregoing, and has an object to obtain a multi-wire saw and a method for cutting an ingot capable of, at the start of cutting a silicon ingot, preventing a wire from being displaced in guide grooves on wire guide rollers and being disengaged from the guide grooves, and reducing the thickness variation of edges of wafers to be cut out.

MEANS FOR SOLVING PROBLEM

To achieve the object, according to the present invention, there is provided a multi-wire saw in which a wire is wound along wire guide grooves formed at a predetermined pitch on surfaces of a plurality of wire guide rollers having rotation axes parallel to one another in a horizontal plane, the wire reciprocates for a plurality of times between the wire guide rollers that are in outermost positions, and a material to be machined is cut while being fed downwardly against the wire traveling in parallel as a plurality of lines on an upper side of the wire guide rollers, the multi-wire saw including slurry supplying unit that is disposed behind the material to be machined with respect to a traveling direction of the wire, and supplies slurry to the wire traveling in parallel as the lines on the upper side; and a wire-lifting restraining member that is a cylindrical body of rotation, and at a start of machining of the material to be machined, so disposed as to come into contact with all the lines of the wire traveling in parallel as the lines on the upper side, near the wire guide rollers and behind the slurry supplying unit with respect to the traveling direction of the wire.

EFFECT OF THE INVENTION

The present invention has an effect that the thickness variation of the edges of the wafers cut out from the material to be machined can be reduced to improve the yield of non-defective wafers by restraining the wire from being lifted at the start of cutting the material to be machined, and preventing the wire from being displaced in the guide grooves on the wire guide rollers and being disengaged from the guide grooves.

EXPLANATIONS OF LETTERS OR NUMERALS

Figure 1:
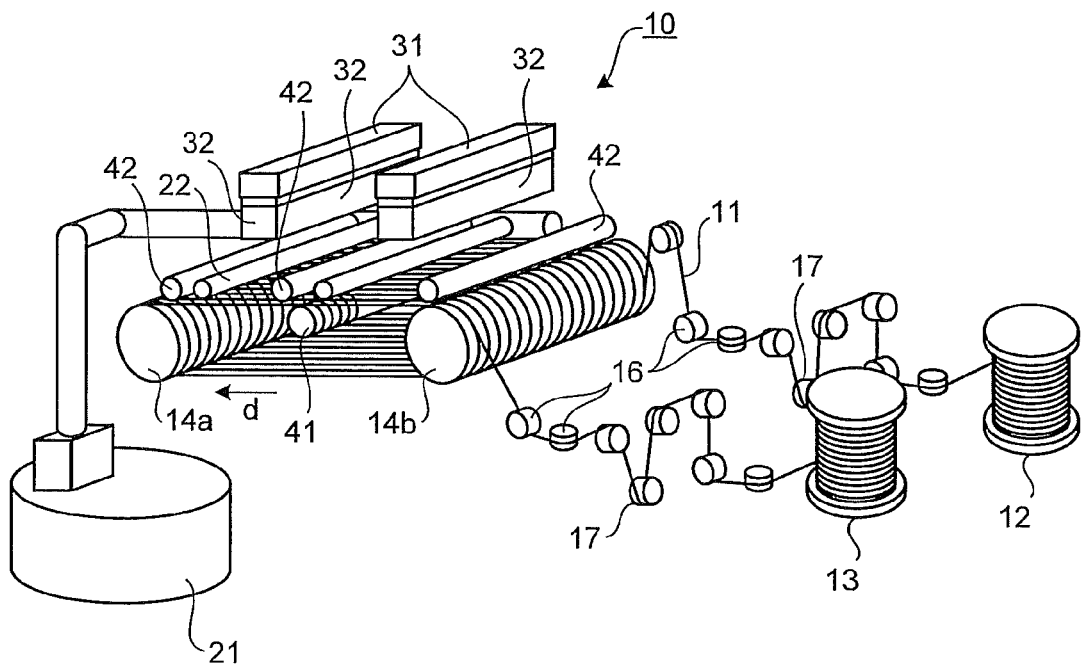
FIG. 1 is a perspective view showing a main part of a multi-wire saw according to the present invention.

10 Multi-wire saw
11 Wire
12 Wire-feeding mechanism
13 Wire winding-up mechanism
14a, 14b, and 41 Wire guide rollers
15, 43 Guide grooves
16 Guide roller
17 Tension roller
21 Slurry stirring and supplying tank
22 Slurry applying head
23 Abrasives
31 Working plate
32 Ingot
42 Wire-lifting restraining member
50 Controller
51 Wire deflection profile calculating unit
52 Machining control unit

BEST MODE(S) FOR CARRYING OUT THE INVENTION

Exemplary embodiments of a multi-wire saw and a method for cutting an ingot according to the present invention will be described below in detail with reference to the appended drawings. It should be noted that the invention is not limited to these embodiments. The embodiments of the invention will be described after explaining the problems at the start of cutting an ingot with a conventional multi-wire saw with reference to some drawings below.

(Problems with Conventional Multi-Wire Saw)

Figure 7:
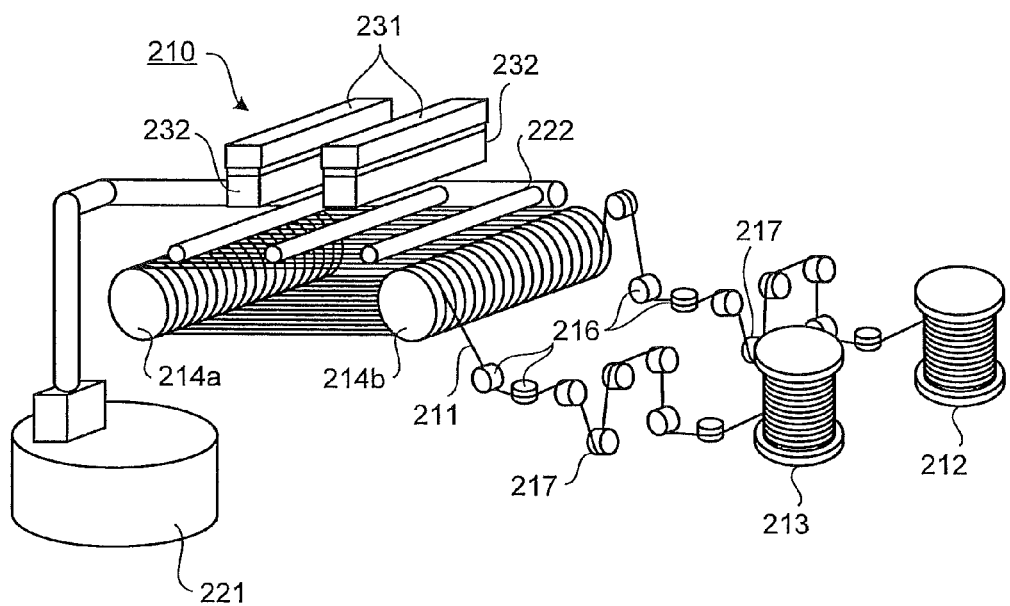
FIG. 7 is a perspective view showing a main part of a conventional multi-wire saw.
Figure 8:
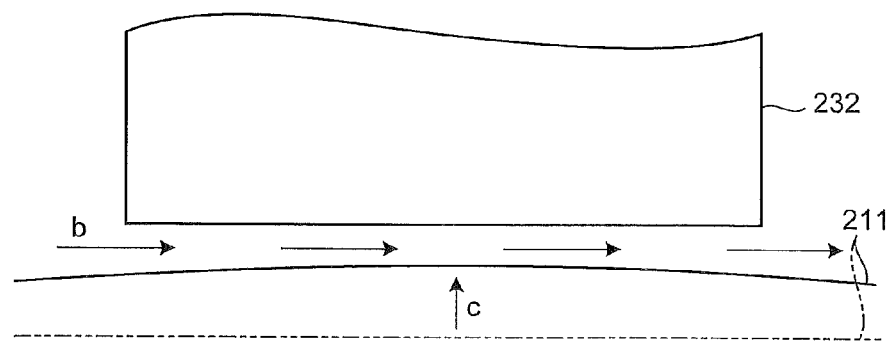
FIG. 8 is a schematic diagram showing a relationship between an ingot and a wire at a start of cutting the ingot.
Figure 9:
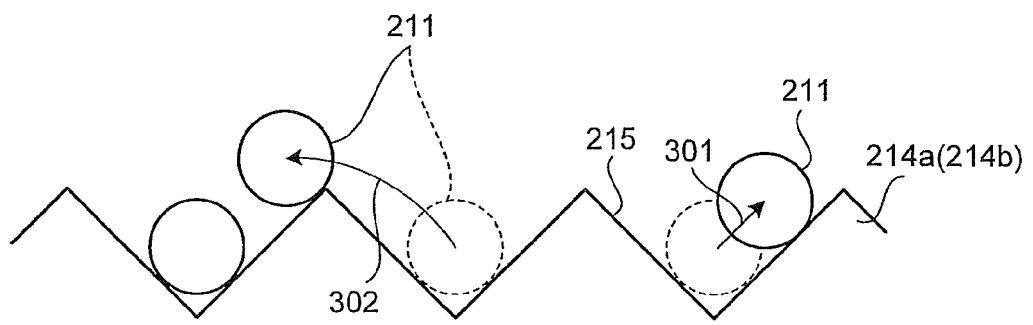
FIG. 9 is a schematic diagram showing a state of the wire in wire guide rollers.

FIG. 7 is a perspective view showing a main part of a conventional multi-wire saw, FIG. 8 is a schematic diagram showing a relationship between an ingot and a wire at the start of cutting of the ingot, and FIG. 9 is a schematic diagram showing a state of the wire in wire guide rollers. As illustrated in FIG. 7, a multi-wire saw 210 includes a wire-feeding mechanism 212 that feeds a wire 211; a wire winding-up mechanism 213 that winds up the fed wire 211; two wire guide rollers 214a and 214b disposed between the wire-feeding mechanism 212 and the wire winding-up mechanism 213; a plurality of guide rollers 216 that guides the wire 211 traveling from the wire-feeding mechanism 212 to the wire guide roller 214a and the wire 211 returning from the wire guide roller 214b to the wire winding-up mechanism 213; and a tension roller 217 that controls tension of the wire 211 guided by the guide rollers 216. A piano wire with a diameter of 0.16 millimeter is generally used for the wire 211. The wire 211 is wound around between the two wire guide rollers 214a and 214b at a pitch of about 0.3 to 0.4 millimeter.

The multi-wire saw 210 also includes a slurry stirring and supplying tank 221 that stores therein slurry and stirs the slurry; and slurry applying heads 222 that supply the slurry from the slurry stirring and supplying tank 221 to a cutting interface between a silicon ingot 232, which is a material to be machined, and the wire 211 between the two wire guide rollers 214a and 214b. The slurry applying heads 222 are arranged above the wire 211, which is positioned above and in between the two wire guide rollers 214a and 214b, such that the heads traverse a plurality of the wire 211. In the example of FIG. 7, three slurry applying heads 222 spaced at a predetermined distance are arranged between the two wire guide rollers 214a and 214b. In each space in between two slurry applying heads 222 next to each other, a working plate 231 is vertically movably disposed to fix the silicon ingot 232 to be cut. The silicon ingot 232 that has a dimension of about 150-millimeter square and a length of about 400 millimeters is fixedly adhered to the working plate 231 to be cut.

When the silicon ingot 232 is cut with the thus configured multi-wire saw 210, the wire-feeding mechanism 212, the two wire guide rollers 214a and 214b, and the wire winding-up mechanism 213 are synchronously controlled to be driven and the position of the tension roller 217 is controlled such that the wire 211 is fed at a speed of about 600 m/min with a predetermined tension constantly applied thereto, and slurry is supplied to the wire 211 via the slurry applying heads 222 from the slurry stirring and supplying tank 221. In this state, the working plate 231 with the silicon ingot 232 fixedly adhered thereto is fed downwardly to cut the silicon ingot 232. Wire disengagement after the silicon ingot 232 has been cut and the wire 211 has been withdrawn can be detected and addressed by being visually inspected by an operator at the time of reworking the silicon ingot 232 with the multi-wire saw 210 or setting the ingot to the multi-wire saw 210.

Incidentally, a thickness variation at cutting start parts (edges of the wafers) and disengagement of the wire 211 from guide grooves 215 formed on the wire guide rollers 214a and 214b when the silicon ingot 232 is cut with the multi-wire saw 210 has been reviewed through experiments. As a result, as illustrated in FIG. 8, the wire 211 was found to be lifted as if sucked toward the silicon ingot 232 when the silicon ingot 232 has approached the wire 211 for about 0.3 millimeter. This is supposedly because an end face of the silicon ingot 232 moved toward an area where the slurry flowed along with the movement of the wire 211 as denoted by an arrow b in the diagram, and the air in a gap between the slurry and the end face of the silicon ingot 232 is discharged along with the movement of the slurry through the gap to produce a negative pressure, whereby the slurry is sucked into the end face of the silicon ingot 232 and the wire 211 was lifted due to the viscosity of the slurry as denoted by an arrow c in the diagram. A dashed double-dotted line in FIG. 8 indicates an initial traveling position of the wire 211 wound around the guide rollers 216. In addition, a decrease in the tension of the wire by reducing the wire diameter made this phenomenon more prominent. It is found that, as illustrated in FIG. 9, the lifting of the wire 211 causes a displacement 301 of the wire 211 in the guide grooves 215, and in the worst scenario, a disengagement 302 of the wire 211 from the guide grooves 215.

A description will be made on a multi-wire saw and a method for cutting an ingot that prevent, at the start of cutting a silicon ingot or the like, the wire displacement in the guide grooves and the wire disengagement from the grooves, and reduce a thickness variation of edges of the wafers cut out.

First Embodiment

Figure 2:
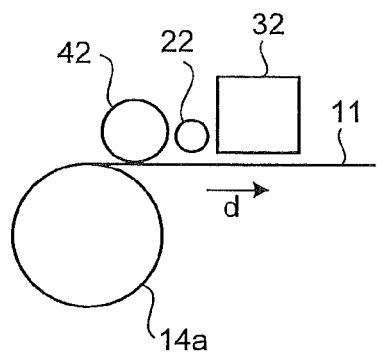
FIG. 2 is a side view showing the structure near a wire guide roller seen from a direction of the rotation axis of the wire guide roller.
Figure 3:
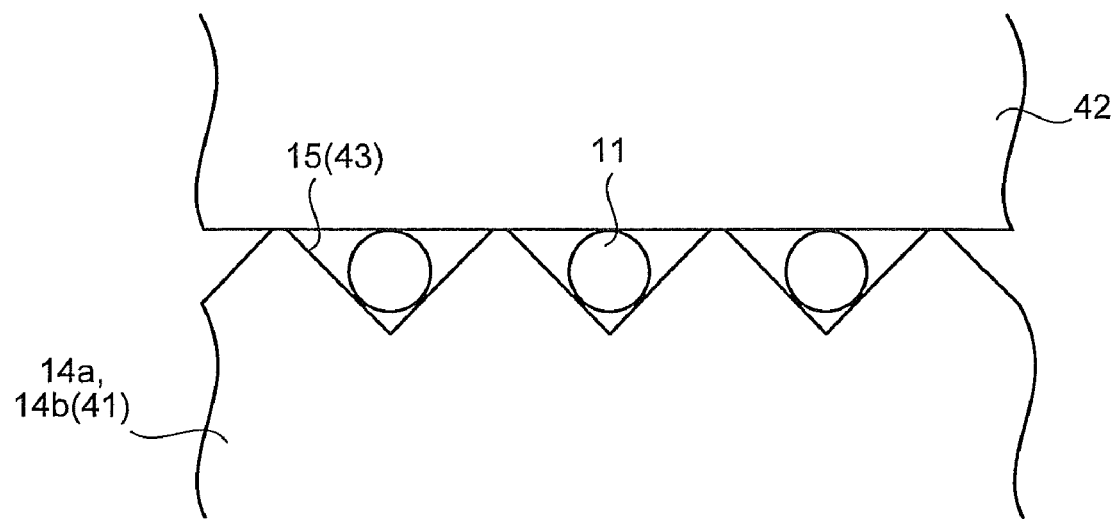
FIG. 3 is a schematic diagram showing a relationship between a wire restraining unit and wire guide rollers.

FIG. 1 is a perspective view showing a main part of a multi-wire saw according to the present invention, FIG. 2 is a side view of the structure near a wire guide roller seen from a direction of the rotation axis of the wire guide roller, and FIG. 3 is a schematic diagram showing a relationship between a wire restraining unit and the wire guide rollers.

As illustrated in FIG. 1, a multi-wire saw 10 includes a wire 11; a wire-feeding mechanism 12 that feeds the wire 11; a wire winding-up mechanism 13 that winds up the fed wire 11; two wire guide rollers 14a and 14b that are disposed between the wire-feeding mechanism 12 and the wire winding-up mechanism 13 such that the rotation axes of the rollers are parallel to each other; a plurality of guide rollers 16 that guides the wire 11 traveling from the wire-feeding mechanism 12 to the wire guide roller 14a and guides the wire 11 from the wire guide roller 14b to the wire winding-up mechanism 13; and a tension roller 17 that controls tension of the wire 11 guided by the guide rollers 16. A piano wire with a smaller diameter than that used for the conventional multi-wire saw 210 (smaller than a diameter of 0.16 millimeter) is used for the wire 11, and a traveling direction of the wire 11 is a direction denoted by an arrow d in the diagram. In addition, the two wire guide rollers 14a and 14b have guide grooves 15 formed thereon at a predetermined pitch; the wire 11 is wound around along the guide grooves 15; and the wire 11 is arranged substantially in parallel as a plurality of lines between the two wire guide rollers 14a and 14b.

The multi-wire saw 10 also includes a slurry stirring and supplying tank 21 that stores therein slurry and stirs the slurry; and slurry applying heads 22 that supply the slurry from the slurry stirring and supplying tank 21 to a cutting interface between a silicon ingot 32, which is a material to be machined, and the wire 11 between the wire guide rollers 14a and 14b. The slurry applying heads 22 are arranged above the wire 11 in between the two wire guide rollers 14a and 14b such that the heads traverse a plurality of the wire 11 arranged in parallel. In the example of FIG. 1, two slurry applying heads 22 spaced at a predetermined distance are disposed above the wire 11 in between the wire guide rollers 14a and 14b. At predetermined upper positions in between the two wire guide rollers 14a and 14b, working plates 31 are vertically movably disposed to fix the ingot 32 to be cut. A silicon ingot as the ingot 32 that has a dimension of about 150-millimeter square and a length of about 400 millimeters is fixedly adhered to each working plate 31.

In the first embodiment, a cylindrical wire guide roller 41 is further disposed in such a way that the roller 41 comes into contact with the wire 11 on the upper side between the two wire guide rollers 14a and 14b from the lower side. The wire guide roller 41 is disposed such that the rotation axis of the wire guide roller 41 is parallel to the rotation axes of the two wire guide rollers 14a and 14b. The wire guide roller 41 is formed with the guide grooves 15 on its surface at a predetermined pitch, similarly to the two wire guide rollers 14a and 14b. When the wire diameter is reduced, the tension applied to the wire 11 needs to be decreased, resulting in more frequent occurrence of wire run-out due to the decreased tension. Therefore, the span between the wire guide rollers 14a and 14b for supporting the wire 11 on the upper side involved with the cutting needs to be shortened. That is why the wire guide roller 41 is provided. In the example of FIG. 1, the wire guide roller 41 is disposed substantially in the center between the two wire guide rollers 14a and 14b. When the distance between the wire guide rollers 14a and 14b is such that the wire run-out due to the decreased tension hardly occurs, the wire guide roller 41 is not required.

In addition, in the first embodiment, wire-lifting restraining members 42 are provided that are disposed to be in contact with the wire 11 on the upper side between the two wire guide rollers 14a and 14b from above. In the example of FIG. 1, three wire-lifting restraining members 42 are arranged at regular intervals between the two wire guide rollers 14a and 14b so as to extend in a direction traversing the wire arranged in parallel, substantially orthogonally. The wire-lifting restraining members 42 are cylindrical bodies capable of rotating in the same direction as the wire guide rollers 14a, 14b, and 41. In addition, as illustrated in FIG. 1 and FIG. 2, the wire-lifting restraining members 42 are disposed near the wire guide rollers 14a, 14b, and 41 and behind the slurry applying heads 22 with respect to the traveling direction d of the wire 11, so that the slurry is not prevented from flowing to a kerf of the ingot 32.

A method for cutting the ingot 32 with the thus configured multi-wire saw 10 will now be explained. The ingot is prepared for cutting by winding the wire 11 around the wire guide rollers 14a, 14b, and 41 to position the wire 11 in a direction of feeding the ingot 32. At this stage, the wire-lifting restraining members 42 are disposed such that the lower side of the wire-lifting restraining members 42 is in contact with the upper side of the wire 11 in the upper part as illustrated in FIG. 3, near the wire guide rollers 14a, 14b, and 41 as illustrated in FIG. 1 and FIG. 2. The wire-lifting restraining members 42 are brought into contact with all lines of the wire 11. This contact operation may be manually performed, or performed by using an automated mechanism. Then, positions of the wire-lifting restraining members 42, which are geometrically bodies of rotation, are determined by the positions of the guide grooves 15 and guide grooves 43 formed on the wire guide rollers 14a, 14b, and 41, and the wire diameter. However, because a depth of the guide grooves 15 and 43 on the wire guide rollers 14a, 14b, and 41, a wire diameter, and a diameter of the body of rotation serving as the wire-lifting restraining member 42 actually vary, the wire 11 may need to be slightly deflected so as to bring the body of rotation (wire-lifting restraining member 42) into contact with all lines of the wire 11.

In this state, slurry is applied to the wire 11 from the slurry applying head 22, the wire-feeding mechanism 12; the wire winding-up mechanism 13, and the wire guide rollers 14a and 14b are synchronously controlled by a drive mechanism (not shown) to be driven to move the wire 11 in a direction denoted by an arrow d; and the working plate 31 with the ingot 32 fixedly adhered thereto is lowered, thereby starting cutting of the ingot 32. When the distance between the ingot 32 and the wire 11 becomes as close as about 0.3 millimeter, the air in a gap between the slurry and the end face of the silicon ingot 32 is discharged along with the movement of the slurry through the gap to produce a negative pressure, whereby the slurry is sucked into the end face of the silicon ingot 32 and the wire 11 is lifted due to the viscosity of the slurry. However, the wire 11 is prevented from being upwardly lifted by the wire-lifting restraining members 42 that are disposed on the upper side of the wire 11 near the working plate 31 (ingot 32) such that the wire 11 is pressed to the guide grooves 15 and 43 on the wire guide rollers 14a, 14b, and 41. As a result, variation at cutting start positions of the ingot 32 is suppressed.

Then, similarly to the conventional multi-wire saw, the working plates 31 are lowered to cut the ingots 32 with the wire 11 moving in the direction of the arrow d.

According to the first embodiment, the wire-lifting restraining members 42 restrain the wire 11 from being lifted by pressing the wire 11 to the guide grooves 15 and 43 on the wire guide rollers 14a, 14b, and 41 at the start of cutting of the ingots 32, whereby the wire 11 is prevented from being displaced in the guide grooves 15 and 43 and from being disengaged from the guide grooves 15 and 43, and a thickness variation of the edges of the wafers cut out from the ingots 32 is reduced. As a result, the method for cutting the ingot has an effect that the yield of non-defective wafers can be improved.

Second Embodiment

Figure 4:
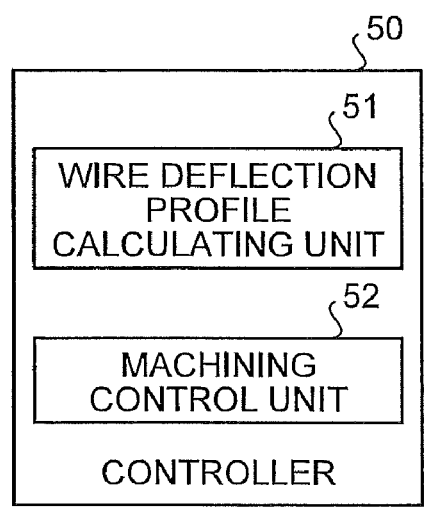
FIG. 4 is a functional block diagram showing a controller of the multi-wire saw.

FIG. 4 is a functional block diagram showing a controller of the multi-wire saw. A controller 50 includes a wire deflection profile calculating unit 51, and a machining control unit 52. The configuration of the multi-wire saw 10 controlled by the controller 50 is the same as that of the first embodiment in FIG. 1, therefore, the explanation thereof will be omitted.

Figure 5:
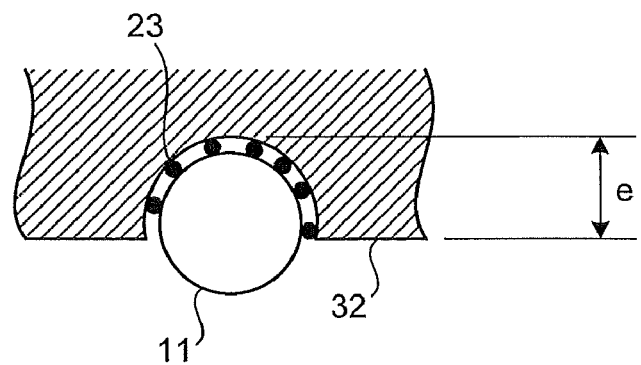
FIG. 5 is a schematic sectional view showing a state of an ingot cut to a depth e at a start of cutting the ingot.
Figure 6:
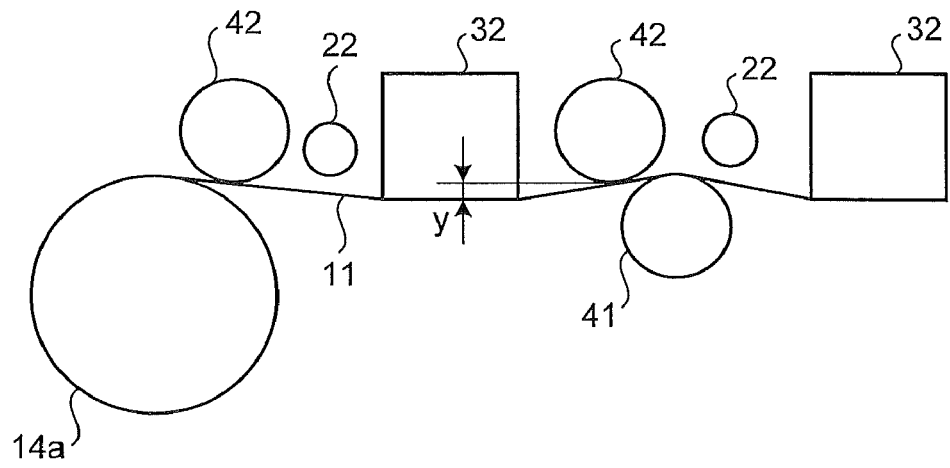
FIG. 6 is a schematic diagram showing a state of the multi-wire saw seen from the direction of the rotation axes of the wire guide rollers at the start of cutting.

The wire deflection profile calculating unit 51 derives deflection of the wire 11 at a predetermined cutting position at the point where a depth of a kerf formed at the start of cutting of the ingots 32 is at least equal to or larger than the radius of the wire 11. FIG. 5 is a schematic sectional view showing a state of an ingot cut to a depth e at the start of cutting of the ingot, and FIG. 6 is a schematic diagram showing a state in which the multi-wire saw is seen from the direction of the rotation axes of the wire guide rollers at the start of cutting. In FIG. 5, a state in which the ingot 32 is cut to a depth e with the wire 11 is illustrated. Between the wire 11 and the ingot 32, abrasives 23 are clogged. In FIG. 6, a deflection y of the wire 11 in which the ingot 32 is cut to a cutting depth e under a predetermined cutting condition is illustrated.

As illustrated in these diagrams, the wire deflection profile calculating unit 51 geometrically calculates a wire deflection profile as illustrated in FIG. 6 at the point where the cutting depth e is at least equal to or larger than the radius of the wire 11 as illustrated in FIG. 5 from a deflection of the wire 11 under a predetermined condition for cutting the ingot, the disposed positions of the wire guide rollers 14a, 14b, and 41, a size and a shape of the guide grooves 15 and 43 on the wire guide rollers 14a, 14b, and 41, and wire-saw structural information including the diameter of the wire 11.

The machining control unit 52 controls the wire-feeding mechanism 12, the wire winding-up mechanism 13, the wire guide rollers 14a and 14b, the tension roller 17, and the wire-lifting restraining member 42 at the machining performed by the multi-wire saw 10, via a driving unit (not shown), such as a motor. In addition, a discharged amount of slurry from the slurry applying head 22 is also controlled thereby. At the start of the machining, the machining control unit 52 causes the wire-lifting restraining member 42 to be disposed based on the wire deflection profile calculated by the wire deflection profile calculating unit 51, more specifically, in such a way that the position of the wire 11 relating to the cutting coincides with the wire deflection profile.

A cutting method with this multi-wire saw 10 will now be explained. The wire deflection profile calculating unit 51 of the controller 50 derives from a predetermined condition for cutting the ingot, and multi-wire saw structural information, a relationship of the deflection y of the wire 11 at a predetermined cutting position as illustrated in FIG. 6, i.e., the wire deflection profile, at the depth e of a kerf formed at the start of cutting of the ingot as illustrated in FIG. 5.

Then, the ingot is prepared for cutting by winding the wire 11 around the wire guide rollers 14a, 14b, and 41 to position the wire 11 in a direction of feeding the ingot 32. At this stage, the machining control unit 52 of the controller 50 causes the lower side of the wire-lifting restraining member 42 that is a cylindrical body of rotation to be disposed at the point that coincides with the wire deflection profile previously calculated, near the wire guide rollers 14a, 14b, and 41. That is, the wire-lifting restraining member 42 arranged in a manner that the wire deflection profile as has been illustrated in FIG. 6 is provided before the cutting process of the ingot 32 is performed.

In this state, slurry is applied to the wire 11 from the slurry applying head 22; the wire-feeding mechanism 12, the wire winding-up mechanism 13, the wire guide rollers 14a and 14b are synchronously controlled by a drive mechanism (not shown) to be driven to move the wire 11 in a direction denoted by an arrow d; and the working plates 31 with the ingot 32 fixedly adhered thereto are lowered, thereby starting cutting of the ingots 32. The body of rotation serving as the wire-lifting restraining member 42 prevents the wire 11 from being lifted when the end face of the ingot 32 approaches the wire 11 by pressing the wire 11 to the guide grooves 15 and 43 on the wire guide rollers 14a, 14b, and 41.

Moreover, when the machining proceeds, a side run-out of the wire 11 is suppressed by a kerf formed on the ingot 32 and because the wire 11 is pressed to the guide grooves 15 and 43 on the wire guide rollers 14a, 14b, and 41 by the body of rotation serving as the wire-lifting restraining member 42. As a result, the position of the wire 11 is restrained. This enables the thickness variation of the edges of the wafers to be further reduced.

Then, similarly to the conventional multi-wire saw, the working plates 31 are lowered to cut the ingots 32 with the wire 11 moving in the direction of the arrow d. The kerf depth e used for obtaining the wire deflection profile in the above explanation may be deeper than the radius of the wire as explained above, rather than being equal to the radius of the wire 11.

According to the second embodiment, because the wire deflection profile representing a deflection amount of the wire 11 when the depth of the kerf becomes at least equal to or larger than at least the radius of the wire 11 is obtained from a predetermined machining condition and the multi-wire saw structural information, and the wire-lifting restraining member 42 is disposed such that the shape of the wire 11 coincides with the wire deflection profile at the start of cutting, when the kerf as deep as the radius of the wire 11 is formed on the ingot 32, this kerf suppresses the side run-out of the wire 11, preventing the wire 11 from being displaced in the guide grooves 15 and 43, and being disengaged from the guide grooves 15 and 43. As a result, the thickness variation of the edges of the wafers can be further reduced. The cutting method of the multi-wire saw has an effect that defects such as cracks and chips on the wafer at a step of manufacturing solar photovoltaic cells can be substantially reduced when a silicon ingot is used for the ingot 32, for example.

Third Embodiment

The wire-lifting restraining member 42 that prevents the wire 11 from being lifted, as described in the first and the second embodiments, may be a cylindrical body of rotation having a cylindrical surface with grooves at the same pitch as that of the guide grooves 15 and 43 formed on the wire guide rollers 14a, 14b, and 41.

According to a third embodiment, obtained is an effect of enabling the side run-out of the wire to be further suppressed at the moment of starting of cutting by forming the guide grooves on the surface of the wire-lifting restraining member 42, thereby further reducing the thickness variation of the edges of the wafers compared with a case where a cylindrical body of rotation having nothing formed on a surface thereof is used.

The effects when the ingot is cut with the multi-wire saw 10 according to the first, the second, and the third embodiments will be explained below. Experiments in cutting were conducted in three rounds for each of the following cases: using the multi-wire saw 10 with the wire-lifting restraining member 42 according to the first to the third embodiments; and using the multi-wire saw 10 without the wire-lifting restraining member 42. The experiments were conducted under the cutting conditions below.

<Cutting Conditions>
Cutting Apparatus: Multi-Wire Saw (the configuration of the apparatus is as described in FIG. 1)
Wire Diameter: 0.1 millimeter (produced by JFE Steel corporation; type SRH)
Abrasives: Silicon Carbide (produced by Fujimi Incorporated., GC #1500, average particle diameter of about 8 micrometers)
Silicon Ingot: two pieces of polycrystalline silicon having a dimension of 150-millimeter square and length of 250 millimeters were disposed
Cutting Pitch: 0.33 millimeter (cutting allowance of 0.13 millimeter, wafer thickness of 0.2 millimeter)
Cutting Speed: 0.35 mm/minute (ingot feeding speed)
Wire Feeding Speed: 600 m/minute
Wire Tension: 14 N
Slurry Tank Temperature Setting: 25 degrees Celsius A mixed solution containing glycerine 40% by mass, water 56% by mass, and sodium hydroxide 4% by mass was prepared, and thereafter abrasives (SiC abrasives) with the same mass were added thereto and stirred to prepare the mixed solution for use as slurry. The slurry was prepared to have a viscosity of 50 to 130 mPa·s at a shear rate of 57.6[1/second] and at a slurry temperature of 25 degrees Celsius. This viscosity range was determined in the preliminary experiments as an appropriate viscosity range when the multi-wire saw 10, and aqueous slurry with the abrasives mixed were used to cut the silicon ingot.

Silicon ingots were cut under the experimental conditions, and then, ten wafers each were picked out from total of six parts that are both end parts and the central parts of two silicon ingots after being cut in a round in which the cutting state was the worst under the respective experimental conditions. The thicknesses of the wafers at the 5 millimeters point from each cutting start end of the wafers were measured at three points in the wire traveling direction. Then, the thickness ranges were determined as a thickness variation. In addition, disengagement of the wire 11 from the guide grooves 15 and 43 was counted. The results of the experiments are represented in Table 1.

TABLE 1

| Wire-lifting restraining member | Disengagement of wire from guide grooves | Thickness variation of edges of wafers |
| --- | --- | --- |
| Not used | disengaged at several tens of positions | ±50 micrometers |
| First Embodiment | Not found | ±15 micrometers |
| Second Embodiment | Not found | ±11 micrometers |
| Third Embodiment | Not found | ±9 micrometers |

As represented in Table 1, when cutting was performed with the multi-wire saw 10 having no wire-lifting restraining member 42, the wire disengagement from the guide grooves 15 and 43 on the wire guide rollers 14*a*, 14*b*, and 41 was observed in all the three cutting experiments. The wire disengagement was observed at several tens of positions in the experiment with the worst cutting state. In addition, the thicknesses of the edges of the wafers cut out from the ingot without disengagement of the wire 11 were measured, and a thickness variation of ±50 micrometers was observed. The wire disengagement frequently occurred on the wire guide roller 41 supposedly because the winding angle of the wire 11 around the wire guide roller 41 is smaller than that of the wire 11 around the two wire guide rollers 14*a* and 14*b* at which the wire 11 turns to head the opposite direction, therefore the friction retention force of the wire guide rollers 14*a* and 14*b* to retain the wire 11 is small.

When cutting was performed with the multi-wire saw 10 including the wire-lifting restraining member 42 as illustrated in the first to the third embodiments, no wire disengagement from the wire guide rollers 14*a*, 14*b*, and 41 was observed, and the thickness variation of the edges of the wafers was small. The thickness variation of the edges of the wafers was reduced to a greater extent in the order of the third, the second, and the first embodiments.

Industrial Applicability

As described above, the multi-wire saw according to the present invention is useful for cutting of a silicon ingot for manufacturing solar cell wafers with the thickness variation of the edges of the wafers suppressed.

The invention claimed is:

1. A multi-wire saw in which a wire is wound along wire guide grooves formed at a predetermined pitch on surfaces of a plurality of wire guide rollers having rotation axes parallel to one another in a horizontal plane, the wire reciprocates for a plurality of times between the wire guide rollers that are in outermost positions, and a material to be machined is cut while being fed downwardly against the wire traveling in parallel as a plurality of lines on an upper side of the wire guide rollers, the multi-wire saw comprising:
   a slurry supplying unit that is disposed behind the material to be machined with respect to a traveling direction of the wire, and supplies slurry to the wire traveling in parallel as the lines on the upper side; and
   a wire-lifting restraining member that is a cylindrical body of rotation, and at a start of machining of the material to be machined, so disposed as to come into contact with all the lines of the wire traveling in parallel as the lines on the upper side, near the wire guide rollers and behind the slurry supplying unit with respect to the traveling direction of the wire.

2. The multi-wire saw according to claim 1, further comprising
   a controller that has
      a wire deflection profile calculating function that calculates a wire deflection profile representing a deflection of the wire on the upper side at a point where a depth of a kerf formed on the material to be machined is equal to or larger than a radius of the wire, and a machining control function that controls and drives the wire guide rollers and a machined-material holding member that holds the material to be machined to cut the material to be machined, wherein the machining control function controls, at the start of machining, the wire-lifting restraining member to be disposed to coincide with the wire deflection profile calculated by the wire deflection profile calculating function.

3. The multi-wire saw according to claim 1, wherein the wire-lifting restraining member has a guide groove at a same pitch as that of the guide grooves formed on the wire guide rollers.

4. A method for cutting an ingot with a multi-wire saw in which a wire is wound along wire guide grooves formed at a predetermined pitch on surfaces of a plurality of wire guide rollers having rotation axes parallel to one another in a horizontal plane, the wire reciprocates for a plurality of times between the wire guide rollers in outermost positions, slurry is supplied to the wire traveling in parallel as a plurality of lines on an upper side of the wire guide rollers from a slurry supplying unit, and an ingot is cut while being fed downwardly against the wire on the upper side, the method for cutting an ingot comprising:

at a start of cutting of the ingot, disposing a wire-lifting restraining member that is a cylindrical body of rotation, near the wire guide rollers and behind the slurry supplying unit with respect to a traveling direction of the wire, such that the wire-lifting restraining member contacts with, at a lower part of the body of rotation, all the lines of the wire traveling in parallel as the lines on the upper side.

5. The method for cutting an ingot according to claim 4, further comprising calculating a wire deflection profile representing a deflection of the wire on the upper side at a point where a depth of a kerf formed on the ingot is equal to or larger than a radius of the wire before a start of the machining of the ingot, and disposing the wire-lifting restraining member to coincide with the calculated wire deflection profile at the start of the machining of the ingot.

6. The method for cutting an ingot according to claim 4, wherein the wire-lifting restraining member has a guide groove at a same pitch as that of the guide grooves formed on the wire guide rollers.

* * * * *